US012779376B2

(12) United States Patent
Girondi

(10) Patent No.: US 12,779,376 B2
(45) Date of Patent: Nov. 3, 2026

(54) FILTRATION ASSEMBLY COMPRISING A FILTERING CARTRIDGE AND AN AUXILIARY DEVICE

(71) Applicant: UFI FILTERS S.P.A., Porto Mantovano (IT)

(72) Inventor: Giorgio Girondi, Porto Mantovano (IT)

(73) Assignee: UFI FILTERS S.P.A., Porto Mantovano (IT)

( * ) Notice: Subject to any disclaimer, the term of this patent is extended or adjusted under 35 U.S.C. 154(b) by 865 days.

(21) Appl. No.: 17/632,699

(22) PCT Filed: Jul. 28, 2020

(86) PCT No.: PCT/IB2020/057113
§ 371 (c)(1),
(2) Date: Feb. 3, 2022

(87) PCT Pub. No.: WO2021/024091
PCT Pub. Date: Feb. 11, 2021

(65) Prior Publication Data
US 2022/0280891 A1 Sep. 8, 2022

(30) Foreign Application Priority Data
Aug. 7, 2019 (IT) ........................ 102019000014280

(51) Int. Cl.
*B01D 29/96* (2006.01)
*B01D 29/31* (2006.01)
(Continued)

(52) U.S. Cl.
CPC ............. *B01D 29/96* (2013.01); *B01D 29/31* (2013.01); *B01D 46/24* (2013.01); *B01D 46/521* (2013.01);
(Continued)

(58) Field of Classification Search
CPC .......... B01D 2201/40; B01D 2201/305; B01D 2201/12; B01D 29/96; B01D 29/31; B01D 46/24; B01D 35/30
See application file for complete search history.

(56) References Cited

U.S. PATENT DOCUMENTS 4,291,651 A * 9/1981 Villella .................... F01M 1/02
123/44 C
5,045,192 A * 9/1991 Terhune ................. B01D 29/15
210/DIG. 17
(Continued)

FOREIGN PATENT DOCUMENTS

WO 2004/091750 A1 10/2004
WO 2008/030707 A1 3/2008
(Continued)

OTHER PUBLICATIONS

D'source Snap Fits | Assembly Techniques for plastics | D'Source Digital Online Learning Environment for Design, 2018 (Year: 2018).*
(Continued)

*Primary Examiner* — Richard C Gurtowski
*Assistant Examiner* — Marriah Ellington
(74) *Attorney, Agent, or Firm* — Merchant & Gould P.C.

(57) ABSTRACT

A filtration assembly for a vehicle fluid extends along an axis and includes a filtering cartridge and an auxiliary device. Cartridge members and device members are configurable in engagement and disengagement configurations. The cartridge members are positioned on an end plate of the filtering cartridge and include blocking groups, each having a stem and a tooth positioned at a stem end projecting laterally defining, with the stem, an engagement undercut. The device members include a housing region and a lug. In the engagement configuration, the tooth snap-fits in the respective housing region, and the lug is housed in the undercut. The
(Continued)

cartridge and device members include a cartridge and device edges to engage in rotary disengagement, in which the cartridge edge and the device edge identifies a ramp. In engagement between the cartridge and device edges, the blocking group elastically flexes radially so the tooth leaves the housing region.

19 Claims, 5 Drawing Sheets

(51) Int. Cl.
*B01D 46/24* (2006.01)
*B01D 46/52* (2006.01)

(52) U.S. Cl.
CPC .. *B01D 2201/12* (2013.01); *B01D 2201/4007* (2013.01); *B01D 2265/025* (2013.01)

(56) References Cited

U.S. PATENT DOCUMENTS

| | | | | |
|---|---|---|---|---|
| 5,614,091 | A * | 3/1997 | Janik | B01D 35/147 210/438 |
| 9,492,768 | B2 * | 11/2016 | Fick | B01D 35/153 |
| 2004/0154975 | A1 * | 8/2004 | Girondi | B01D 29/96 210/450 |
| 2005/0123346 | A1 | 6/2005 | Nakamura et al. | |
| 2006/0186031 | A1 * | 8/2006 | Fick | B01D 29/118 210/235 |
| 2007/0158263 | A1 * | 7/2007 | Brandt | B01D 29/96 210/437 |
| 2010/0089805 | A1 * | 4/2010 | South | B01D 36/005 210/86 |
| 2010/0219116 | A1 * | 9/2010 | Milum | B01D 29/21 210/232 |
| 2012/0012513 | A1 * | 1/2012 | Jokschas | B01D 36/003 210/232 |
| 2012/0031828 | A1 * | 2/2012 | van Savooijen | B01D 35/147 210/232 |
| 2013/0098822 | A1 * | 4/2013 | Girondi | B01D 29/21 210/454 |
| 2013/0193057 | A1 * | 8/2013 | Honermann | B01D 29/232 210/442 |
| 2014/0163664 | A1 * | 6/2014 | Goldsmith | A61B 17/0057 604/93.01 |
| 2016/0338274 | A1 * | 11/2016 | Messner | B05B 1/044 |

FOREIGN PATENT DOCUMENTS

| | | | |
|---|---|---|---|
| WO | 2010/123344 | A1 | 10/2010 |
| WO | 2019/142122 | A1 | 7/2019 |

OTHER PUBLICATIONS

Bayer Material Science, Snap-Fit Joints for Plastics—A Design Guide, 20 (Year: 2010).*

International Search Report and Written Opinion of the International Searching Authority for International Patent Application No. PCT/IB2020/057113 mailed Sep. 23, 2020, 9 pages.

Italian Search Report for Italian Patent Application No. 102019000014280 mailed May 14, 2020, 2 pages.

* cited by examiner

FILTRATION ASSEMBLY COMPRISING A FILTERING CARTRIDGE AND AN AUXILIARY DEVICE

This application is a National Stage Application of PCT/IB2020/057113, filed 28 Jul. 2020, which claims benefit of Ser. No. 102019000014280, filed 7 Aug. 2019 in Italy, and which applications are incorporated herein by reference. To the extent appropriate, a claim of priority is made to each of the above-disclosed applications.

FIELD OF APPLICATION

The present invention relates to a filtration assembly of a vehicle.

The present invention finds preferred application in the automotive field. Specifically, in fact, the present invention is placed in the context of systems for filtering a fluid with particular reference to the liquid or gaseous fluids required for the operation of a motor vehicle. In other words, the fluid filtration assembly and its components according the present invention have application in air circuits, oil circuits, fuel circuits and/or water (or aqueous solution) circuits, and ventilation circuits for blow-by gases comprised in a vehicle.

Fluid filtration assemblies in automotive applications are well known in the art.

The known filtration assemblies comprise one (or more) filtering cartridges integrally connected to one or more auxiliary devices. In the present discussion, the term "auxiliary device" means any component (or group of components) belonging to the filtration assembly which is suitable to be operatively connectable to the filtering cartridge to perform the specific operations for which it is intended. For example, the auxiliary device is a sensor group and/or a cap group housed at least partially in the filtration chamber of the filtration assembly in which the cartridge is housed.

A problem which is particularly felt in the known filtration assemblies is that of operatively connecting said filtering cartridges and said auxiliary devices in a safe manner, for example so as to avoid any mutual disconnection, but simply replicable, for example to allow simple maintenance operations.

In the known solutions, in fact, designers must choose for one of the two needs, sacrificing the other.

Solution of the Invention

Therefore, it is object of the present invention to provide a filtration assembly, which ensures the safe blocking of the filtering cartridge with the respective auxiliary device, having safe, simple, and intuitive engagement and disengagement operations.

DESCRIPTION OF THE DRAWINGS

Further features and advantages of the invention will become apparent from the following description of preferred embodiments thereof, given by way of non-limiting example, with reference to the accompanying drawings, in which.

DETAILED DESCRIPTION

Figure 2A:
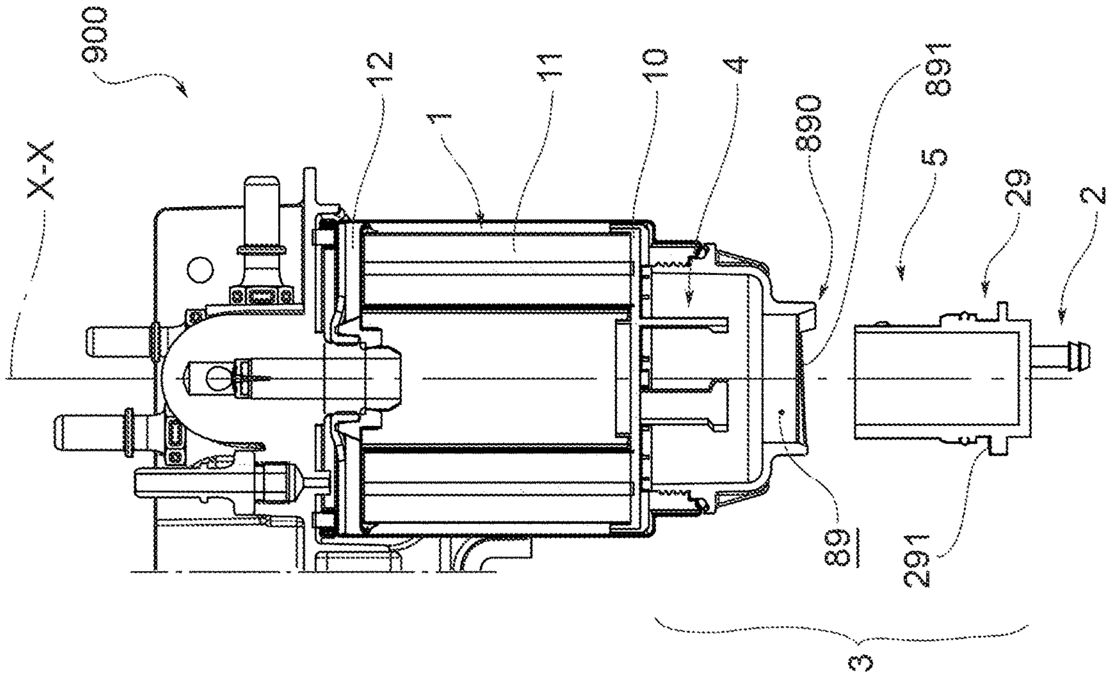
FIGS. 2*a*, 2*b*, 2*c*, 2*d* and 2*e* show the filtration assembly in section in respective engagement and disengagement phases between a filtering cartridge and an auxiliary device, in particular they show a disengagement configuration, an axial insertion configuration, an engagement configuration according to a first section plane, an engagement configuration according to a further section plane, a rotary disengagement configuration.
Figure 1:
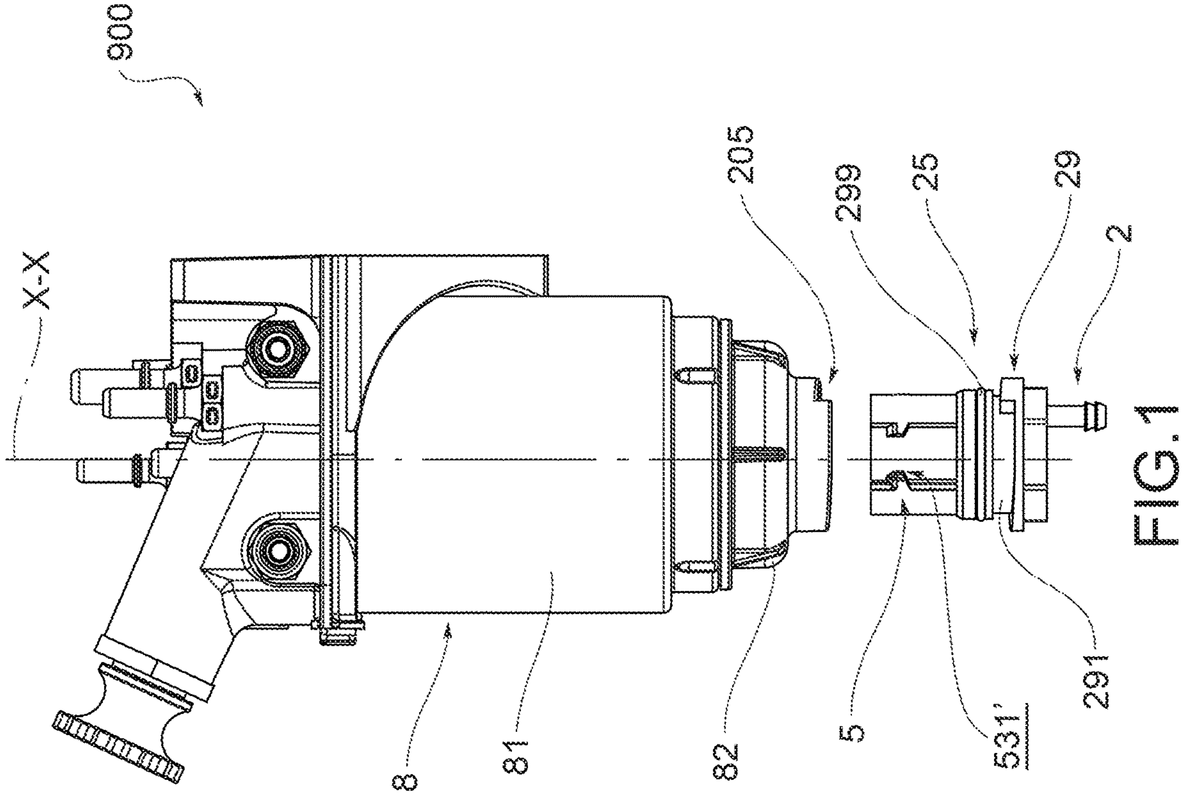
FIG. 1 shows a side view of the filtration assembly in accordance with the present invention in a configuration in which the respective auxiliary device is disengaged from the filtering cartridge.
Figure 2C:
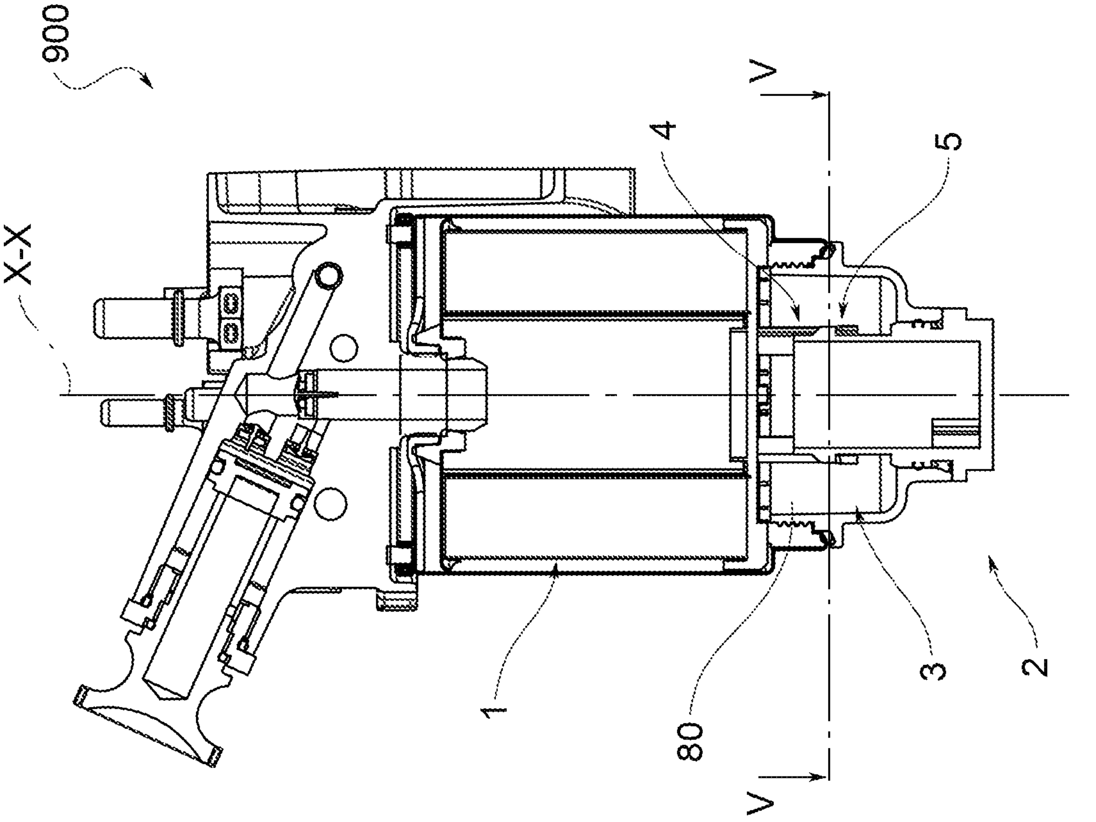
Figure 2B:
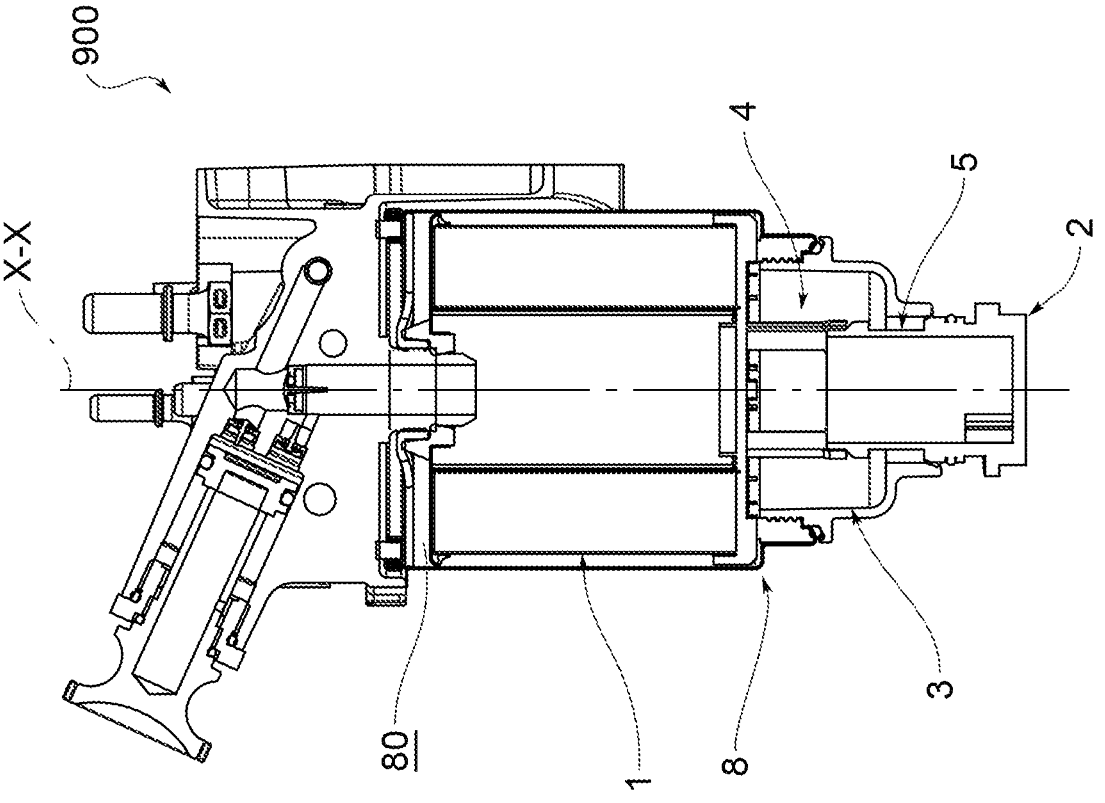
Figure 2E:
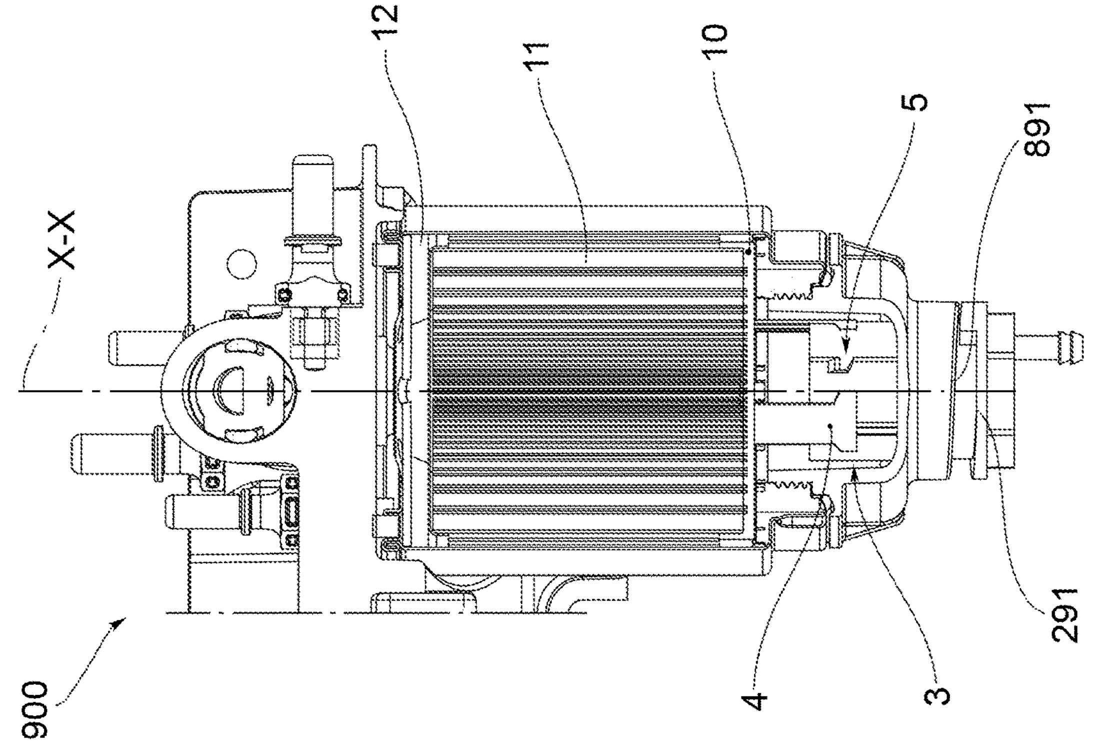
Figure 2D:
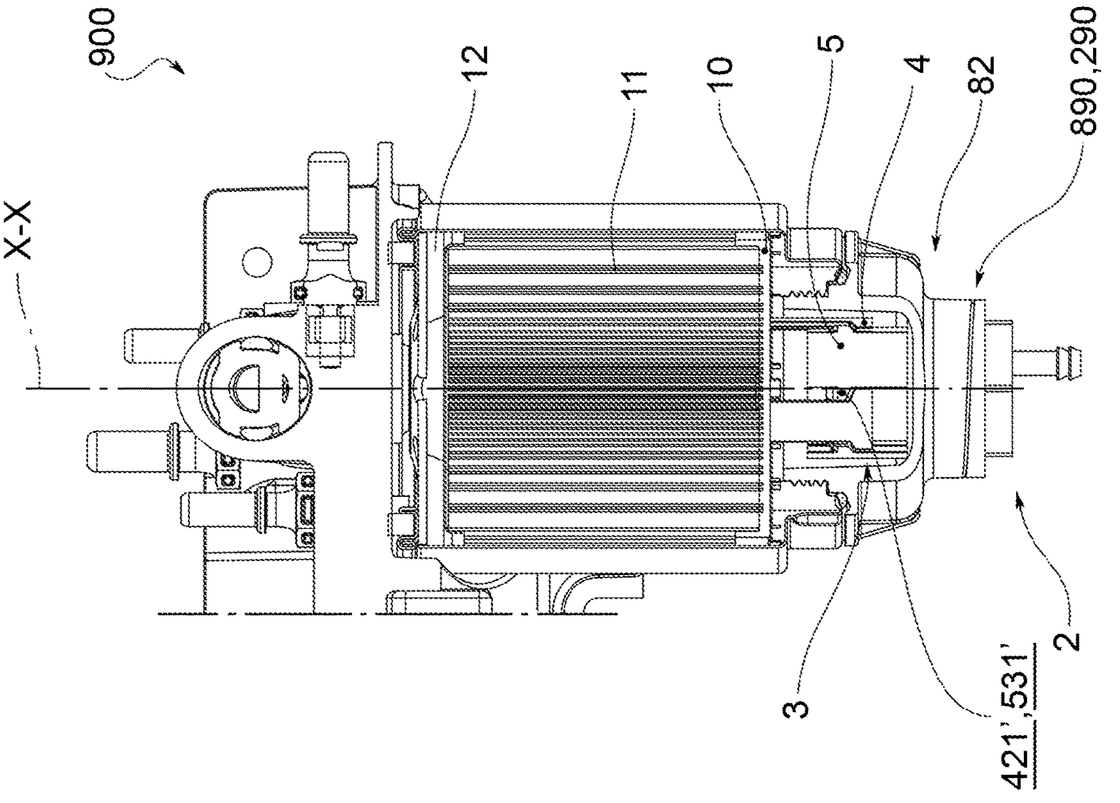
Figure 3:
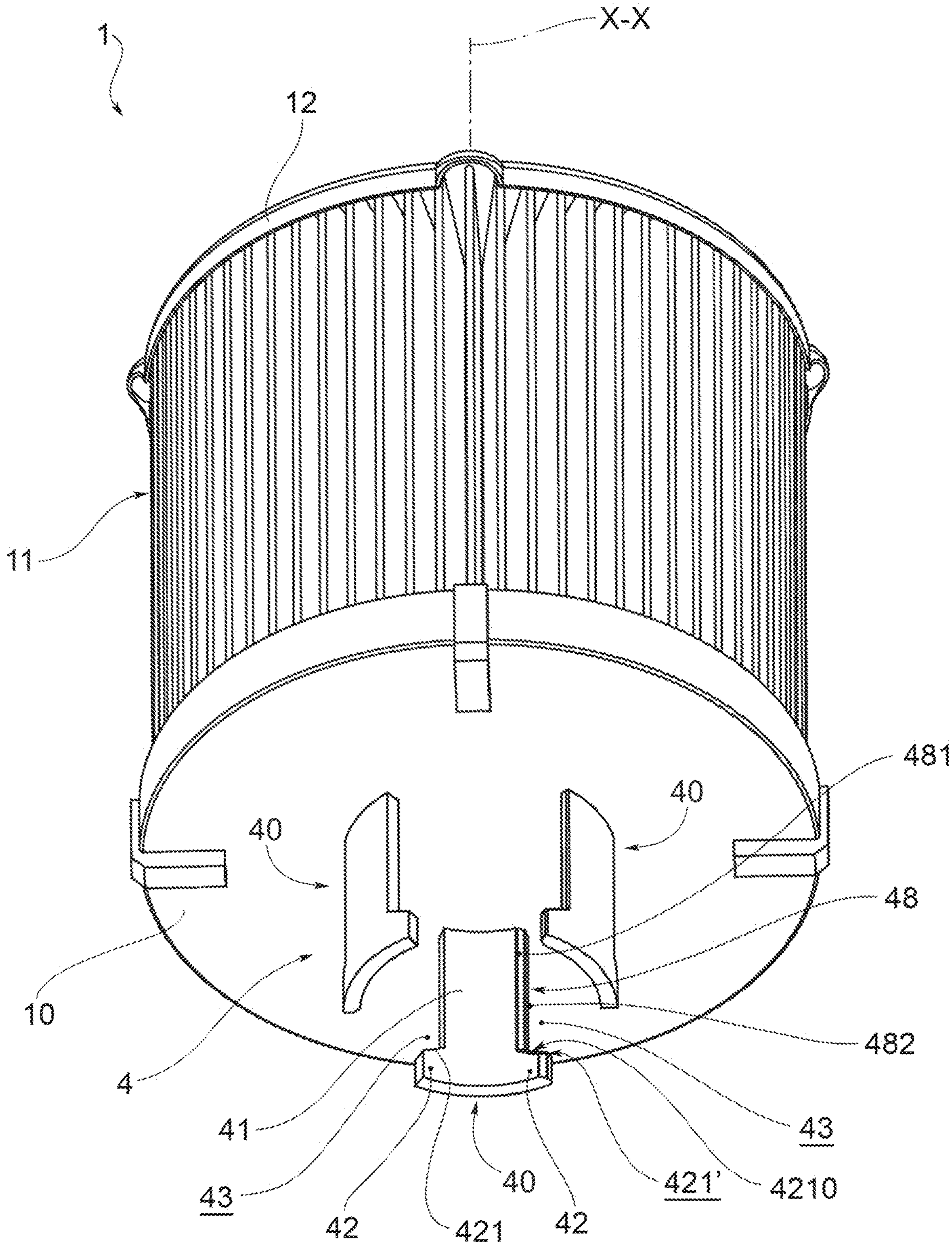
FIG. 3 shows a perspective view of a filtering cartridge, according to a preferred embodiment, comprised in a filtration assembly in accordance with the present invention.
Figure 4A:
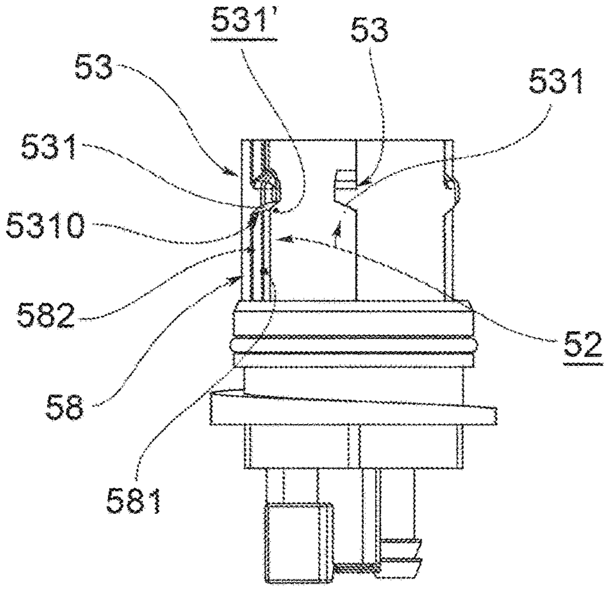
FIGS. 4*a*' and 4*a*" are two side views of an auxiliary device, according to a preferred embodiment, comprised in a filtration assembly in accordance with the present invention.
Figure 4A:
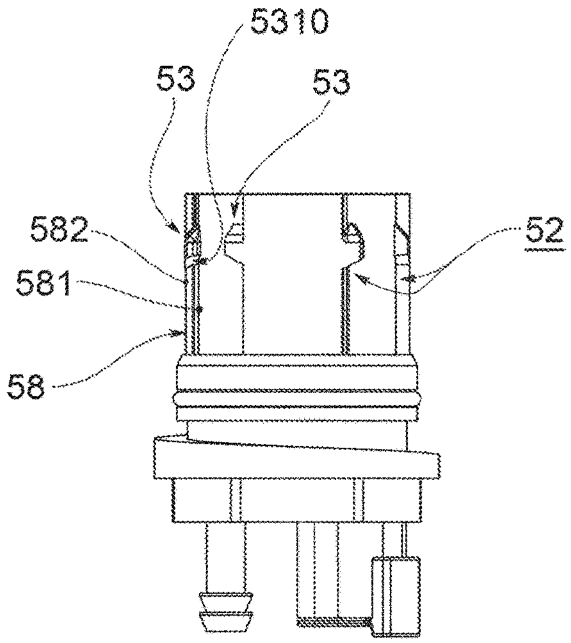
Figure 4B:
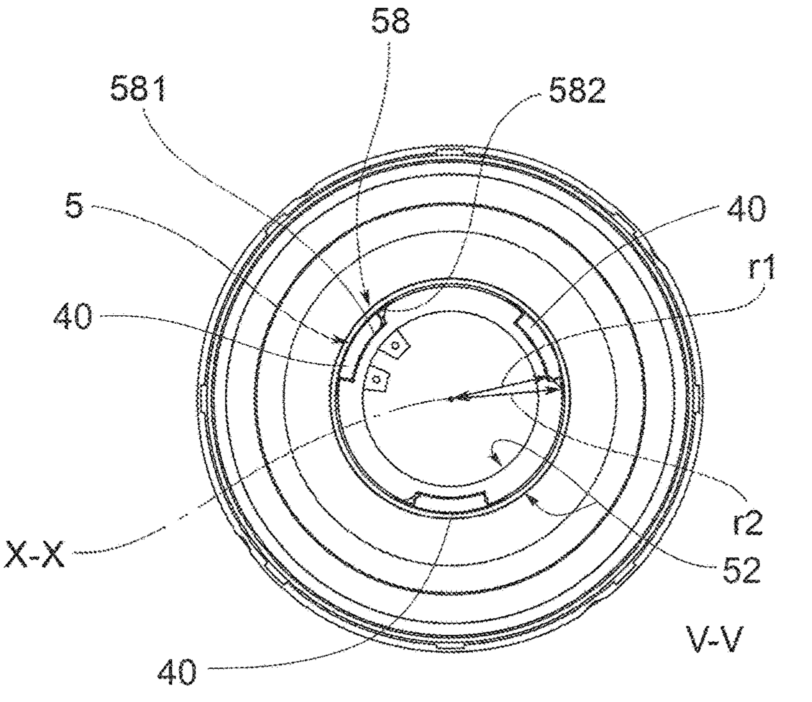
FIG. 4*b* shows a section view along the section plane V-V of FIG. 2*c*.

In the accompanying drawings, reference numeral 900 indicates a filtration assembly in accordance with the present invention as a whole. The axis X-X shows the extension direction along which and about which said filtration assembly 1 and the related components extend.

Furthermore, numeral 1 indicates a filtering cartridge and numeral 2 indicates an auxiliary device.

Preferably, the filtering cartridge 1 and the auxiliary device 2 in turn extend along and about the axis X-X.

According to the purpose of the present invention, the filtering cartridge 1 and the auxiliary device 2 are specifically suitable to mutually engage and disengage.

In particular, the filtration assembly 900 further comprises engagement/disengagement means 3 comprising cartridge members 4 comprised in the filtering cartridge 1 and device members 5 comprised in the auxiliary device 2.

The cartridge members 4 and the device members 5 are specifically conformed to be configurable in an engagement configuration, by means of a reciprocal axial action along the axis X-X, and in a disengagement configuration, by means of a reciprocal action of rotation about the axis X-X, respectively.

In other words, the engagement/disengagement means 3 are not mutually engageable by means of operations other than a movement in the axial direction. Furthermore, the engagement/disengagement means 3 are not mutually disengageable by means of operations other than a movement in the rotational direction.

In the present description, the engagement/disengagement operations are exclusively intended as those operations which involve the mutual engagement between the cartridge members 4 and device members 2 or which involve the mutual disengagement between the cartridge members 4 and device members 2. In some preferred embodiments, these operations require, upstream or downstream, further approaching or moving away operations (in the axial direction and/or in the rotary direction) required for the complete execution of the engagement/disengagement operations.

In accordance with a preferred embodiment, the filtration assembly 1 also comprises objectification elements required to determine the mutual angular position of the respective cartridge members 4 and device members 5 and ensure the correct execution of the mutual engagement or disengagement steps in the axial direction. Preferably, said objectification elements are housed on the various components involved in the aforementioned operations, for example the filtering cartridge 1 and/or the auxiliary device 2 and/or the optional filter body 8 described below.

According to a preferred embodiment, the filtering cartridge 1 comprises an end plate 10, at least one filtering septum 11, preferably of the hollow cylindrical type, which is traversable by the fluid radially, and a secondary end plate 12.

According to the present invention, the cartridge members 4 are positioned, preferably comprised, in said end plate 10.

Preferably, the cartridge members 4 extend substantially parallel to and about the axis X-X.

Specifically, in fact, the cartridge members 4 comprise at least two blocking groups 40 angularly spaced apart, preferably equally spaced apart.

Preferably, the cartridge members 4 comprise three or four blocking groups 40 angularly spaced apart, preferably equally spaced apart.

In accordance with a preferred embodiment, said blocking groups 40 lie on an imaginary plane that extends radially spaced apart from the axis X-X. In other words, the blocking groups 40 are substantially planar and arched.

In accordance with a preferred embodiment, the blocking groups 40 are angularly equidistant from the axis X-X.

According to a preferred embodiment, the blocking groups 40 are all positioned at the same distance from the axis X-X.

According to a variant, each blocking group 40 has a respective distance from the axis X-X.

In accordance with the present invention, each blocking group 40 comprises a stem 41 and at least one tooth 42.

The tooth 42 is positioned at the axial end of the stem 41 projecting therefrom in a lateral direction, that is, in a circumferential or tangential direction, defining an engagement undercut 43 with the stem 41.

In other words, the stem 41 and tooth 42 give the blocking group 40, which lies on the respective imaginary plane, a substantially "L" shape.

In other embodiments, a blocking group 40 comprises two teeth 42 at the axial end of the stem 41.

In other words, the stem 41 and teeth 42 give the blocking group 40, which lies on the respective imaginary plane, a substantially "T" shape.

The device members 5 are positioned and shaped complementarily to the cartridge members 4.

Preferably, in fact, the device members 5 comprise at least one housing region 52 and a lug 53.

In accordance with the present invention, in the engagement configuration, the tooth 42 is housed in a snap-fit manner in the respective housing region 52 specially shaped.

In accordance with the present invention, in the engagement configuration, the lug 53 is housed in the undercut 43.

In accordance with the present invention, the approach of the filtering cartridge 1 and the auxiliary device 2 in the axial direction results in the mutual engagement of the tooth 42 on the lug 53. This engagement results in the elastic flexing of the blocking group 40 in a radial direction and therefore in the axial snap-fit insertion of the cartridge members 4 into the device members 5.

In accordance with a preferred embodiment, the housing region 52 also houses the stem 41 of the respective blocking group 40.

Preferably, the housing region 52 houses at least the respective tooth 42, but in some preferred embodiments, the housing region 52 houses the entire blocking group 40, that is, both the tooth 42 and the stem 41.

Furthermore, in accordance with the present invention, the cartridge members 4 and the device members 5 comprise a cartridge edge 48 and a device edge 58.

In particular, the cartridge edge 48 and the device edge 58 extend substantially along the axis X-X.

Preferably, the cartridge edge 48 is the outer, lateral edge of the blocking group 40. Preferably, said cartridge edge 48 extends along the stem 41 and/or along the tooth 42.

Preferably, the device edge 58 laterally delimits the housing region 52 facing it.

Preferably, said device edge 58 extends laterally, defining the housing region 52, and/or extends along the lug 53.

In other words, the device edge 58 is located on one of the two sides of the housing region 52.

In accordance with the present invention, the cartridge edge 48 and the device edge 58 are suitable to mutually engage in the rotary disengagement action.

In fact, at least one of cartridge edge 48 and device edge 58 is specifically shaped, thus identifying a ramp. Preferably, the remaining edge is therefore suitable to slide (during the rotary disengagement operations) on said ramp. In particular, the remaining edge is thus suitable to slide (during the rotary disengagement operations) on said ramp, causing the elastic flexing of the blocking group 40 in a radial direction, freeing each tooth 42 from the related housing region 52.

In fact, in accordance with the present invention, the shaped edge that identifies the ramp comprises a first edge, radially proximal to the axis X-X, and a second edge, radially distal from the axis X-X.

According to the present invention, in the mutual engagement between the cartridge edge 48 and the device edge 58, the respective blocking group 40 elastically flexes in a radial direction so that the tooth 42 leaves the respective housing region 52. In other words, due to the shaped edge, it is possible to extract the blocking group 40 fixed in a snap-fit manner to the device members 5. In other words, due to the presence of the shaped edge, the cartridge members 4 and the device members 5 are mutually disengageable. For example, by means of the edge, the auxiliary device 2 is disassemblable from the filtering cartridge 1.

In other words, the shaped edge that identifies the ramp comprises a first edge and a second edge having different radial distance from the axis X-X. Where the first edge is radially spaced apart from the axis X-X by a first radial distance r1, while the second edge is radially spaced apart from the axis X-X by a second radial distance r2. The value of said second radial distance r2 is greater than the value of said first distance r1.

In accordance with a variant, both the cartridge edge 48 and the device edge 58 are complementarily shaped, each identifying a ramp comprising a first edge, radially proximal to the axis X-X, and a second edge, radially distal from the axis X-X.

According to a preferred embodiment, at least one of the cartridge edge 48 and the device edge 58 is shaped thus identifying the ramp, while the other one has a substantially arched or in square shape to allow it to slide on the ramp.

In the accompanying figures, the cartridge edge 48 comprises a first cartridge edge 481 and a second cartridge edge 482.

In the accompanying figures, the device edge 58 comprises a first device edge 581 and a second device edge 582.

In a preferred embodiment, the cartridge edge 48 is positioned on the stem 41.

In a preferred embodiment, the cartridge edge 48 is positioned on the tooth 42.

In a variant, the cartridge edge 48 is positioned on both the stem 41 and the tooth 42.

In a preferred embodiment, the device edge 58 is positioned on the lug 53.

In a preferred embodiment, the device edge 58 is positioned on the sidewall delimiting the housing region 52. In a variant, the device edge 58 is positioned on both the lug 53 and the sidewall delimiting the housing region 52.

In accordance with these preferred embodiments, each edge is positioned to extend linearly on the respective component. According to some embodiments, the edge extends over a single component having a substantially rectilinear course. According to other embodiments, the edge extends over a plurality of components having a segmented course.

In still other words, each edge may fully extend only on the blocking group or on the housing region or, alternatively, extend on both the blocking group and the housing region 52, but in different axial portions along the axis X-X.

In accordance with a preferred embodiment, each tooth 42 comprises a tilted cartridge edge 421 so as to have a tapered shape in the lateral direction.

Preferably, said tilted cartridge edge 421 faces the undercut 43.

According to a preferred embodiment, each lug 53 comprises a tilted protruding edge 531 specifically shaped similarly to the tilted cartridge edge 421.

Preferably, said tilted protruding edge 531 faces the housing region 52.

According to a preferred embodiment, the tilted cartridge edge 421 and the tilted protruding edge 531 comprise a cartridge engagement wall 4210 and a lug engagement wall 5310, respectively, which are preferably adjacent on an imaginary plane parallel to or at most inclined with respect to an imaginary plane orthogonal to the axis X-X, so as to prevent the tooth 42 from slipping on the lug 53 in an axial pulling action.

In other words, in a configuration with the cartridge members 4 and the device members 5 engaged, the cartridge engagement wall 4210 and the lug engagement wall 5310 are such as to discharge any axial pulling actions onto each other.

In accordance with a preferred embodiment, the cartridge engagement wall 4210 and the lug engagement wall 5310 are orthogonal to the axis X-X.

In accordance with a further preferred embodiment, the cartridge engagement wall 4210 and the lug engagement wall 5310 are inclined with respect to the axis X-X, thus identifying a cartridge retention undercut 421' and a lug retention undercut 531' suitable to house a portion of the lug 53 and of the tooth 42, respectively. In other words, in an engagement configuration, the tooth 42 and the lug 53 are shaped to interpenetrate each other, creating a snap-fit coupling between the cartridge and the non-removable auxiliary device through an axial pulling action in the opposite direction to that with which the engagement is obtained. In accordance with the present invention, only the described mutual engagement between the cartridge edges and the device edges allow the release of the coupling and the decoupling between said components.

In accordance with a preferred embodiment, the filtration assembly 900 further comprises a filter body 8 comprising a filtration chamber 80. Preferably, the filtering cartridge 1 is housable in said filtration chamber 80 to perform said filtration operations.

Preferably, as mentioned, the auxiliary device 2 is for example a sensor group, and/or a cap group, being engageable with the filtering cartridge 1 to perform the specific operations for which it is intended.

In accordance with a preferred embodiment, the auxiliary device 2 is a sensor group suitable to detect the presence of water (for example water separated from the fuel in diesel-type fuel filtration operations) collected inside the filtration assembly 1.

In accordance with a preferred embodiment, the auxiliary device 2 is a cap group suitable to allow the drainage of the filtration assembly 1; preferably, it is a cap group suitable to allow the drainage of the water (for example the water separated from the fuel in diesel-type fuel filtration operations) collected inside the filtration assembly 1.

In accordance with a preferred embodiment, the auxiliary device 2 is a heater group.

In accordance with a preferred embodiment, the auxiliary device 2 is a pressure and/or temperature detection group.

According to a preferred embodiment, the auxiliary device 2 is a control unit comprising specific control valve means, for example, a bleed valve, a bypass valve, or a thermostatic valve.

According to some preferred embodiments, the auxiliary device 2 comprises a plurality of the aforementioned types of features, for example being both a cap group and a sensor group and/or a heater group, and/or a detection and/or control group.

According to a preferred embodiment, the auxiliary device 2 is also engageable with the filter body 8.

In accordance with a preferred embodiment, the filter body 8 comprises a through opening 89 in which the auxiliary device 2 is housed.

Preferably, said through opening 89 is positioned along the axis X-X. Preferably, said through opening 89 is concentric to the axis X-X.

In accordance with a preferred embodiment, the auxiliary device 2 sealingly engages the filter body 8. Preferably, the filtration chamber 20 is delimited in the mutual engagement between the auxiliary device 2 and the filter body 8.

Preferably, in the mutual engagement of the engagement/disengagement means 3 provided between the auxiliary device 2 and the filtering cartridge 1, the auxiliary device 2 sealingly engages the filter body 8.

According to a preferred embodiment, the through opening 89 is delimited by an opening ring 890 and the auxiliary device 2 is positionable in the through opening 89 comprising an auxiliary collar 29 suitable to engage the opening ring 890.

According to a preferred embodiment, the auxiliary device comprises a preferably radial, annular gasket 299 suitable to engage the opening ring 890.

According to a preferred embodiment, the opening ring 890 and the auxiliary collar 29 have an annular extension.

In accordance with a preferred embodiment, the opening ring 890 and the auxiliary collar 29 comprise, over the length of said annular extension, engagement steps 891, 291 inclined with respect to a plane orthogonal to the axis X-X, respectively. Preferably, the disengagement between said steps imposes the rotation direction of the disengagement. Preferably, said steps are specially shaped to slide over one another and allow a rotational disengagement between the auxiliary device 2 and the filter body 8.

In accordance with a preferred embodiment, said disengagement between the auxiliary device 2 and the filter body 8 also simultaneously results in the release (disengagement) between the cartridge members 4 and the device members 5.

According to a preferred embodiment, said steps extend circumferentially for a section that is sufficient for the disengagement on the ramp between the cartridge members 4 and device members 5.

In accordance with a preferred embodiment, the filter body 8 consists of two half-shells 81, 82 mutually screwable together.

Preferably, the auxiliary device 2 is operatively connected, according to the above-described modes, to one of the two half-shells. Preferably, the through opening 89 is obtained in a half-shell 82.

In a preferred embodiment, the mutual unscrewing of the two half-shells is such as to results in the mutual disengagement between the cartridge members 4 and the device members 5.

In accordance with a preferred embodiment, the housing region 52 is formed on the auxiliary device 2 facing radially outwards, i.e., radially facing away from the axis X-X, i.e., in which the cartridge members 4 are outside the device members 5.

In other words, in accordance with a preferred embodiment, the cartridge members 4 surround the device members 5.

In accordance with a variant, the housing region 52 is formed on the auxiliary device 2 facing radially inwards, i.e., facing the axis X-X, i.e., in which the cartridge members 4 are inside the device members 5.

In other words, according to a further preferred embodiment, the cartridge members 4 are surrounded by the device members 5.

Innovatively, the fluid filtration assembly of a vehicle described above largely fulfills the purpose of the present invention, overcoming the typical problems of the background art.

Advantageously, in fact, the engagement operations between the filtering cartridge and the auxiliary device involve a single step of mutual axial insertion.

Advantageously, in fact, the disengagement operations between the filtering cartridge and the auxiliary device involve a single step of mutual rotation.

Advantageously, in the engagement and disengagement operations of the two components, the operations are substantially guided and therefore error-proof.

Advantageously, the engagement and disengagement operations of the filtering cartridge-filter body are highly simplified, intuitive, and guided.

Advantageously, in the engagement configuration, the engagement/disengagement means ensure the fixed and safe axial positioning of the two components, as well as maintained over time.

Advantageously, the axial blocking action achieved by the lateral portions of the respective teeth is performed in an effective and reliable manner.

Advantageously, the axial blocking action due to the tilted edges is discharged onto the complementary components provided on the filter body, in an effective manner.

Advantageously, the geometry of the coupling system is simplified, thus simplifying the dimensioning of the teeth and the respective seats, and advantageously minimizing the complexity of the molds used for the production of the engagement/disengagement means and the related costs.

Therefore, a further advantage of the present invention is that the installation of filtering cartridges not provided with blocking groups such as those described on filter bodies is not allowed. In other words, it is not possible to use, for example, traditional cartridges in the filtration group, thus ensuring, for example during maintenance operations, that filtering cartridges of manufacturer-assured quality are used.

Advantageously, the engagement/disengagement means have a small axial footprint, allowing a maximization of the filtering surface of the filtering septum, thus meeting the needs of the specific filtration group.

Advantageously, the described engagement/disengagement means are easily implementable on filtering cartridges of different sizes and diameters.

Advantageously, the described engagement/disengagement means are easily implementable on end plates of different shapes, allowing the implementation of the coupling system on both cylindrical cartridges and cartridges having a main extension direction, for example with rectangular or elliptical end plates, and on irregularly shaped cartridges.

Advantageously, the engagement means have a small radial footprint and are providable on both filtering cartridges affected by radial flow and filtering cartridges affected by axial flow.

Advantageously, the auxiliary device directly engages the filtering cartridge.

Advantageously, the engagement between the filtering cartridge and the auxiliary device allows the elimination of any additional fixing systems provided on the auxiliary device, thus simplifying the shape and reducing the production cost thereof.

Advantageously, the engagement between the filtering cartridge and the auxiliary device can be used for filtering devices in which the axis is vertically oriented, horizontally oriented or inclined with respect to the ground, under use conditions thereof.

Advantageously, the auxiliary device is housable and suitable to form part of the filter body. Advantageously, the mutual engagement between the auxiliary device and the filter body makes the engagement between the auxiliary device and the filtering cartridge more solid. Advantageously, the mutual engagement between the auxiliary device and the filter body makes the auxiliary device an integral part, as well as an "active" component of the filter body, for example by operating as a sensor or as a drain plug for the filtration chamber.

It is apparent that those skilled in the art, in order to meet contingent needs, may make changes to the filtering cartridge, the filter body, the fluid filtering group or the assembly method, all included within the scope of protection as defined by the following claims.

LIST OF REFERENCE SYMBOLS

- 1 filtering cartridge
- 10 end plate
- 11 filtering septum
- 12 secondary end plate
- 2 auxiliary device
- 29 auxiliary collar
- 291 engagement step
- 299 annular gasket
- 3 engagement/disengagement means
- 4 cartridge members
- 40 blocking group
- 41 stem
- 42 tooth
- 421 tilted cartridge edge
- 421' cartridge retention undercut
- 4210 cartridge engagement wall
- 43 undercut
- 48 cartridge edge
- 481 first cartridge edge
- 482 second cartridge edge
- 5 device members

52 housing region
53 lug
531 tilted protruding edge
531' cartridge retention undercut
5310 cartridge engagement wall
58 device edge
581 first device edge
582 second device edge
8 filter body
80 filtration chamber
81 first half-shell
82 second half-shell
89 through opening
890 opening ring
891 opening step
900 filtration assembly
X-X main axis
r1 first radial distance
r2 second radial distance

The invention claimed is:

1. Filtration assembly of a fluid of a vehicle which extends along an axis and comprises:

a filtering cartridge;

an auxiliary device;

an engagement/disengagement device comprising cartridge members comprised in the filtering cartridge and device members comprised in the auxiliary device, respectively shaped to be configurable in an engagement configuration by exclusively mutual axial insertion between the filtering cartridge and the auxiliary device along the axis, and in a disengagement configuration by exclusively mutual rotation between the filtering cartridge and the auxiliary device about the axis;

wherein the filtering cartridge comprises at an axial end an end plate on which said cartridge members are positioned extending substantially parallel to and about the axis;

wherein the cartridge members comprise at least two blocking groups, each of the blocking groups comprising a stem and at least one tooth positioned at an axial end of the stem projecting laterally in a circumferential or tangential direction, defining with the stem an engagement undercut;

wherein the device members comprise at least one housing region and a lug;

wherein, in the engagement configuration, the tooth is housed in a snap-fit manner in the respective housing region, and the lug is housed in the engagement undercut;

wherein the cartridge members comprise a first cartridge edge and the device members comprise a device edge, wherein the first cartridge edge and the device edge extend substantially along the axis, to disengage with each other in mutual rotation, wherein at least one of the first cartridge edge and the device edge is shaped, defining a ramp comprising a first edge radially proximal to the axis and a second edge radially distal from the axis, and an other of the first cartridge edge and the device edge is configured to slide on said ramp;

wherein the respective blocking group is configured to flex elastically in a radial direction from the first cartridge edge or the device edge sliding on the ramp during the exclusively mutual rotation so that the tooth disengages the respective housing region;

wherein each tooth comprises a tilted second cartridge edge, wherein the tilted second cartridge edge has a tapered shape in a lateral direction, and wherein the tilted second cartridge edge faces the engagement undercut.

2. Filtration assembly according to claim 1, wherein both the first cartridge edge and the device edge are complementarily shaped, each of the first cartridge edge and the device edge forming the ramp.

3. Filtration assembly according to claim 1, wherein the first cartridge edge is positioned on the stem and/or on the tooth while the device edge is positioned on the lug and/or on a side wall delimiting the housing region.

4. Filtration assembly according to claim 1, wherein the cartridge members, and the device engagement members are radially spaced apart from the axis.

5. Filtration assembly according to claim 1, wherein the cartridge members comprise two, three or four blocking groups angularly equidistant.

6. Filtration assembly according to claim 1, wherein each blocking group comprises on the stem two teeth which extend from the stem in two opposite lateral directions, wherein the device members are shaped to house both said teeth.

7. Filtration assembly according to claim 1, further comprising a filter body comprising a filtration chamber, wherein the filtering cartridge is housable in said filtration chamber.

8. Filtration assembly according to claim 1, wherein the auxiliary device is a cap group and/or a sensor group and/or a heater group, and/or a detection and/or control group, which is engageable with the filtering cartridge.

9. Filtration assembly according to claim 7, wherein the auxiliary device is engageable with the filter body.

10. Filtration assembly according to claim 9, wherein the filter body comprises, along the axis, a through opening delimited by an opening ring and the auxiliary device is positionable in the through opening comprising an auxiliary collar configured to engage the opening ring, wherein the auxiliary device sealingly engages the filter body.

11. Filtration assembly according to claim 10, wherein the opening ring and the auxiliary collar comprise circumferentially extending engagement steps respectively inclined with respect to the axis, wherein the engagement steps are configured to slide over one another and allow rotational disengagement between the auxiliary device and the filter body.

12. Filtration assembly according to claim 8, wherein said housing region is formed on the auxiliary device facing radially outwards, away from the axis, wherein the cartridge members are external to the device members, or vice versa, the housing region is formed on the auxiliary device facing radially inwards, wherein the cartridge members are internal to the device members.

13. Filtration assembly according to claim 1, wherein the filtering cartridge comprises:

the end plate;

at least one filtering which is traversable by the fluid radially;

a secondary end plate;

wherein the end plate and the secondary end plate are at the axial ends of the filtering septum.

14. Filtration assembly according to claim 13, wherein the at least one filtering septum comprises a hollow cylinder.

15. Filtration assembly according to claim 1, wherein the cartridge engagement wall and the lug engagement wall are oblique or orthogonal to the axis to prevent the tooth from slipping on the lug in axial pulling.

16. Filtration assembly according to claim 1, wherein the cartridge engagement wall is orthogonal to the axis, and the lug engagement wall orthogonal to the axis.

17. Filtration assembly according to claim 1, wherein each lug comprises a tilted protruding edge facing the housing region, wherein the tilted second cartridge edge comprises a cartridge engagement wall, and the tilted protruding edge comprises a lug engagement wall.

18. Filtration assembly according to claim 1, wherein the filtering cartridge and the auxiliary device are not mutually engageable by operations other than axial movement.

19. Filtration assembly according to claim 1, wherein the filtering cartridge and the auxiliary device are not mutually disengageable by operations other than rotational movement.

* * * * *